United States Patent
Lebel et al.

(10) Patent No.: US 9,885,251 B2
(45) Date of Patent: Feb. 6, 2018

(54) METHOD AND APPARATUS FOR CONTROLLING MODULATED COOLING OF A GAS TURBINE COMPONENT

(71) Applicant: Rolls-Royce PLC, London (GB)

(72) Inventors: Jean-Francois Lebel, Beaconsfield (CA); Alex Davies, Westmount (CA); Frank Haselbach, Derbyshire (GB); Paul Fletcher, Rugby (GB)

(73) Assignee: ROLLS-ROYCE PLC, London (GB)

(*) Notice: Subject to any disclaimer, the term of this patent is extended or adjusted under 35 U.S.C. 154(b) by 857 days.

(21) Appl. No.: 14/139,119

(22) Filed: Dec. 23, 2013

(65) Prior Publication Data

US 2014/0271119 A1    Sep. 18, 2014

Related U.S. Application Data

(60) Provisional application No. 61/784,134, filed on Mar. 14, 2013.

(51) Int. Cl.
| | | |
|---|---|---|
| *F01D 25/12* | (2006.01) | |
| *F01D 5/08* | (2006.01) | |
| *F01D 5/18* | (2006.01) | |

(52) U.S. Cl.
CPC ............ *F01D 25/12* (2013.01); *F01D 5/08* (2013.01); *F01D 5/18* (2013.01); *F05D 2260/94* (2013.01); *F05D 2270/303* (2013.01); *F05D 2270/306* (2013.01); *F05D 2270/3062* (2013.01); *F05D 2270/332* (2013.01); *Y02T 50/676* (2013.01)

(58) Field of Classification Search
CPC ... F01D 5/18–5/189; F01D 5/08–5/088; F01D 25/08; F01D 25/12; F05D 2270/332; F05D 2270/303; F05D 2270/112; F05D 2270/114; F05D 2270/3062; F05D 2270/3061; F05D 2260/20; F05D 2260/94; F05D 2260/201; F05D 2206/202; F05D 2260/204
See application file for complete search history.

(56) References Cited

U.S. PATENT DOCUMENTS

| | | |
|---|---|---|
| 2,951,340 A | 9/1960 | Howard |
| 4,296,599 A | 10/1981 | Adamson |

(Continued)

FOREIGN PATENT DOCUMENTS

| | | |
|---|---|---|
| DE | 102010020800 A1 | 11/2011 |
| FR | 2968718 A1 | 6/2012 |
| WO | WO-2009/140100 A1 | 11/2009 |

OTHER PUBLICATIONS

International Search Report for PCT/US2013/072925 dated Mar. 19, 2014.

*Primary Examiner* — Gregory Anderson
*Assistant Examiner* — Julian Getachew
(74) *Attorney, Agent, or Firm* — Oliff PLC

(57) ABSTRACT

A method of modulating the cooling of a gas turbine component is disclosed. The method includes determining a target component temperature at which the gas turbine component can be maintained without the gas turbine component experiencing a failure over the course of an indicated life of the gas turbine component; scheduling a cooling air value to the target component temperature; and determining one or more of a demanded cooling air temperature and a demanded cooling air mass flow rate based on the scheduled cooling air value.

9 Claims, 5 Drawing Sheets

(56) References Cited

U.S. PATENT DOCUMENTS

| | | | |
|---|---|---|---|
| 4,416,111 A | 11/1983 | Lenahan et al. | |
| 4,462,204 A | 7/1984 | Hull | |
| 4,708,588 A | 11/1987 | Schwarz et al. | |
| 4,709,546 A | 12/1987 | Weiler | |
| 4,807,433 A | 2/1989 | Maclin et al. | |
| 5,160,096 A | 11/1992 | Perkins et al. | |
| 5,575,616 A | 11/1996 | Hagle et al. | |
| 5,743,079 A | 4/1998 | Walsh et al. | |
| 6,067,792 A | 5/2000 | Tubbs | |
| 6,481,211 B1 | 11/2002 | Haas | |
| 6,935,120 B2 * | 8/2005 | Adibhatla | F02C 9/26 60/782 |
| 7,237,386 B2 | 7/2007 | Hoffmann et al. | |
| 2011/0079020 A1 | 4/2011 | Durocher et al. | |

\* cited by examiner

METHOD AND APPARATUS FOR CONTROLLING MODULATED COOLING OF A GAS TURBINE COMPONENT

CROSS-REFERENCE TO RELATED APPLICATIONS

This application claims priority to U.S. Provisional Patent Application No. 61/784,134 filed Mar. 14, 2013, the contents of which are hereby incorporated in their entirety.

TECHNICAL FIELD

The present application relates to methods and apparatuses for controlling modulation for cooling a gas turbine component, and more particularly, but not exclusively, to controlling modulation based on heat transfer parameters and life and performance management of the gas turbine component.

BACKGROUND

Providing cooling to gas turbine components such as vanes, disks, and blades, and the structure and manner for modulating cooling air to such components, remains an area of interest. Some existing systems and methods have various shortcomings, drawbacks, and disadvantages relative to certain applications. Accordingly, there remains a need for further contributions in this area of technology.

SUMMARY

One embodiment of the present disclosure is a unique method and apparatus for modulating the cooling air mass flow rate and/or the cooling air temperature to cool a gas turbine component of a gas turbine engine based on desired life and/or performance of the gas turbine component and one or more heat transfer parameters of the turbine component. Other embodiments include apparatuses, systems, devices, hardware, methods, and combinations for cooling gas turbine components. Further embodiments, forms, features, aspects, benefits, and advantages of the present application shall become apparent from the description and figures provided herewith.

BRIEF DESCRIPTION OF THE DRAWINGS

Features of the application will be better understood from the following detailed description when considered in reference to the accompanying drawings, in which.

DETAILED DESCRIPTION

Figure 1:
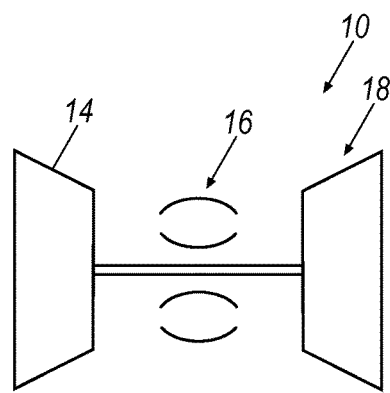
FIG. 1 is a diagram showing the major sections of a gas turbine engine according to an embodiment.

While the present disclosure can take many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications of the described embodiments, and any further applications of the principles of the disclosure as described herein, are contemplated as would normally occur to one skilled in the art to which the disclosure relates.

Figure 2:
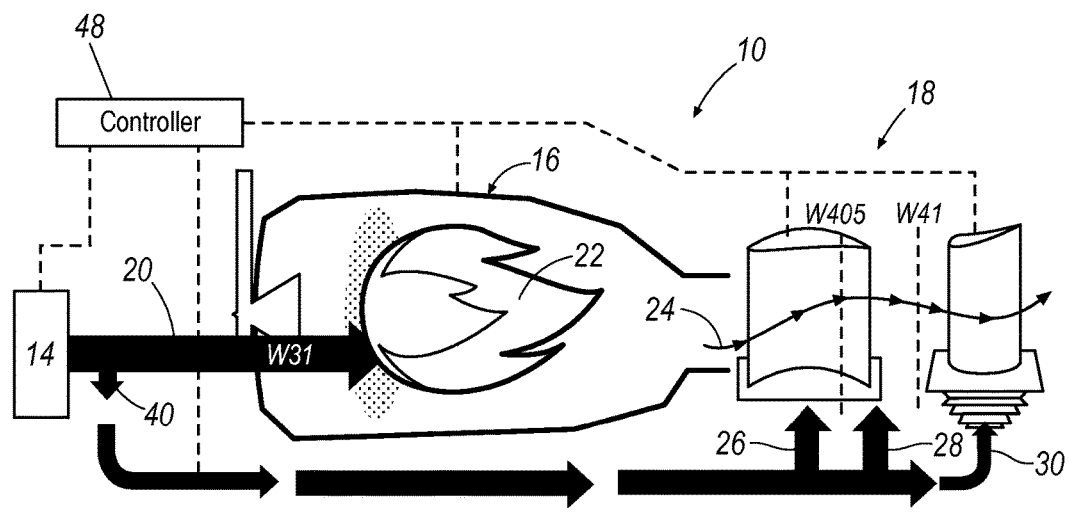
FIG. 2 is a schematic diagram showing an arc portion of a compressor section, a combustion section, and a turbine section of the FIG. 1 gas turbine engine, as viewed along the axis of the engine, and a cooling modulation control system, according to an embodiment.

With reference to FIGS. 1 and 2, there is illustrated a schematic representation of one form of a gas turbine engine 10. The gas turbine engine 10 can be an open cycle engine or a closed cycle engine. The gas turbine engine 10 can be utilized in land-based applications, for example power generation and oil and gas pumping, offshore platform applications, for example oil and gas pumping, marine-based applications, for example naval propulsion, or aircraft applications, for example aircraft propulsion and auxiliary power units, and other applications known to those of ordinary skill in the art.

The gas turbine engine 10 includes a compressor section 14, a combustion section 16, and a turbine section 18. It will be appreciated that the gas turbine engine 10 is not limited to the configuration shown in FIGS. 1 and 2, and other embodiments are contemplated. For example, the gas turbine engine 10 can comprise a multi-spool engine, a low or high bypass ratio (BPR) engine, among others. In operation, the compressor section 14 compresses air received from the intake of the gas turbine engine 10, and the compressed air that is exhausted from the compressor section 14, for example as indicated at reference numeral 20 in FIG. 2, is directed into the combustion section 16. The combustion section 16 mixes the compressed air with fuel and the fuel/air mixture is combusted to generate hot combustion gas products, indicated for example at reference numeral 22 in FIG. 2. The hot combustion gas products expand through, and thereby drive, the turbine section 18, as illustrated for example by the gas flow path 24 in FIG. 2. The turbine section 18, in turn, can be used to power various mechanical and/or electrical loads, for example to drive the compressor section 14, or one or more gear drives, or to provide electrical power to auxiliary power units, control systems, or the like, to name a few. Cooling air, routed via flow passages 26, 28, and 30 shown in FIG. 2, is used to cool components of the turbine section 18. As will be described in greater detail below, one or more control algorithms can control modulation of the cooling air to maintain the gas turbine component's temperature at an appropriate level to achieve a failure-free life and/or performance of the gas turbine component and, accordingly, the turbine section 18 or gas turbine engine 10 of which it is a part.

Figure 3:
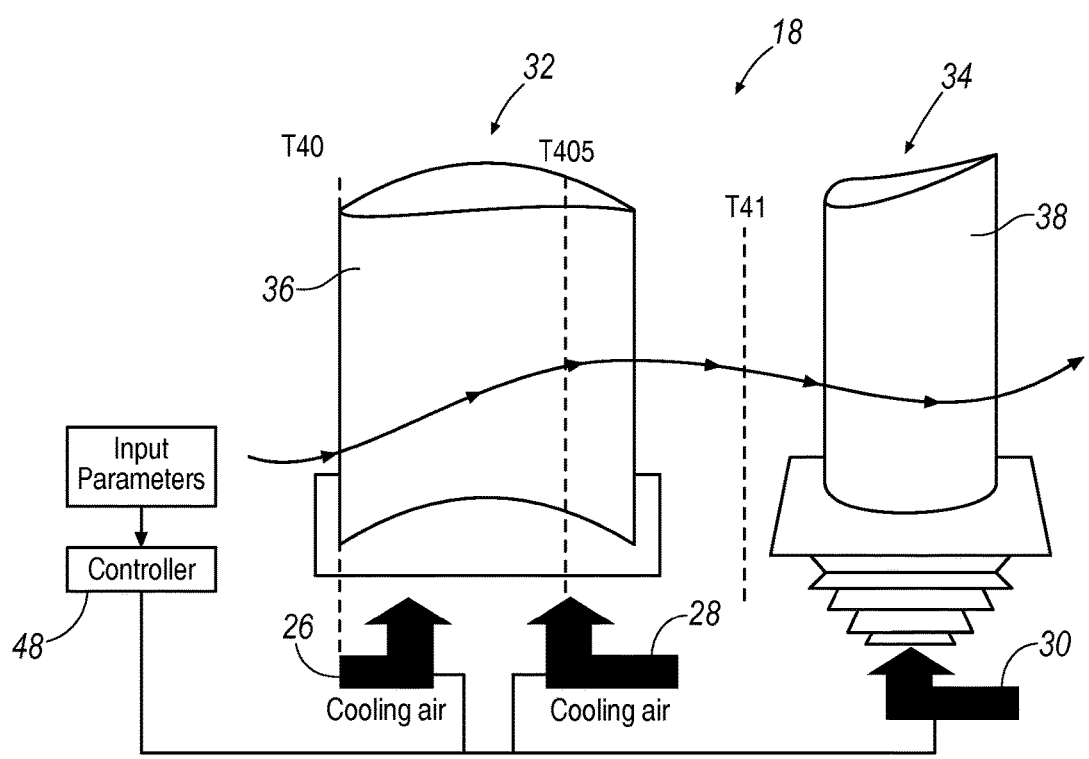
FIG. 3 is a schematic diagram showing an enlargement of the arc portion of the turbine section of FIG. 2, as viewed along the axis of the engine, according to an embodiment.

FIG. 3 shows an enlargement of the turbine section 18 according to an embodiment in greater detail. The turbine section 18 is of the axial flow type and is disposed about the axis of the gas turbine engine 10. Although the illustrative turbine section 18 is of the axial flow type, the turbine section 18 is not limited as such and other embodiments are contemplated. For example, the turbine section 18 can comprise a radial flow type, or other suitable turbine configuration. The turbine section 18 includes a stationary member 32 and a rotating member 34 disposed axially aft of the stationary member 32. In the FIG. 3 embodiment, the stationary member 32 and the rotating member 34 together compose a single turbine stage. As will be appreciated, the turbine section 18 can comprise any number of stages. For purposes of brevity and clarity only a single stage is described herein.

The stationary member 32, or stator, is profiled with a plurality of circumferentially spaced coaxially fixed vanes 36, also referred to herein as turbine nozzle guide vanes (NGV) 36. The rotating member 34, or rotor, is profiled with a plurality of circumferentially spaced blades 38 attached to a disk (not shown) that is seated on a rotating shaft of the gas turbine engine 10. In FIG. 3, only a single vane 36 and a single blade 38 of the arc portion are shown. The turbine stage (or stages) can be of an impulse turbine type or a reaction turbine type, or any combination thereof, depending on the particular gas turbine application and the distribution of the energy of the combustion gas products among the stationary member 32 and the rotating member 34.

The stationary member 32 and rotating member 34 can be made of any material suited for the application of the turbine section 18 and the gas turbine engine 10 of which it is a part. In one non-limiting form, the stationary member 32 and the rotating member 34 comprise a metal or metal alloy material. In another form, the stationary member 32 and the rotating member 34 are made of different materials. In another form, the vanes 36, blades 38, and/or disk, of the stationary member 32 and the rotating member 34 comprise different materials.

Cooling air, which can be supplied from the gas turbine engine 10 itself, for example by way of an offtake 40 from a location between the discharge of the compressor section 14 and the combustion section 16 as shown in FIG. 2, is channeled to different components (at different stations) of the turbine section 18. In the embodiment of FIGS. 2 and 3, for example, cooling air is modulated to the flow passages 26, 28, and 30. The cooling air can be controlled based on modulating one or more of the cooling air temperature (TCooling air) and the cooling air mass flow rate (WCooling air) channeled to the turbine section 18, as will be described in greater detail below. As will be appreciated by those skilled in the art, any suitable mechanism and technique, or combination of mechanisms and techniques, can be utilized to control the supply of cooling air, including varying its temperature and varying its mass flow rate. In one form, for example, the cooling air can be supplied by a dedicated cooling device that is not a component of the gas turbine engine 10 and is capable of modulating the cooling air temperature and modulating the cooling air mass flow rate. In an alternative or additional form, one or more heat exchangers or similar cooling transfer devices can be used to cool the cooling air, creating for example "cooled cooling air." In an alternative or additional form, the mass flow rate of the cooling air can be modulated by one or more valves, pumps, actuators, or other suitable flow control devices, or combination of flow control devices. In an alternative or additional form, the cooling air can be supplied from the gas turbine engine 10 itself, for example as in the FIG. 2 embodiment by way of the offtake 40 between the compressor section 14 and the combustion section 16, and if necessary or desired, cooled via an intermediate heat exchanger or the like. The cooling air can be supplied to the vanes 36 of the stationary member 32, the blades 38 of the rotating member 34, or any other component, or combination of components, of the turbine section 18. In the illustrative embodiment the cooling air is shown supplied to only a single stage gas turbine; it will be appreciated that the cooling air can be supplied to any number of stages, and modulated as desired or appropriate at the different stages, or components of the stages.

Figure 4:
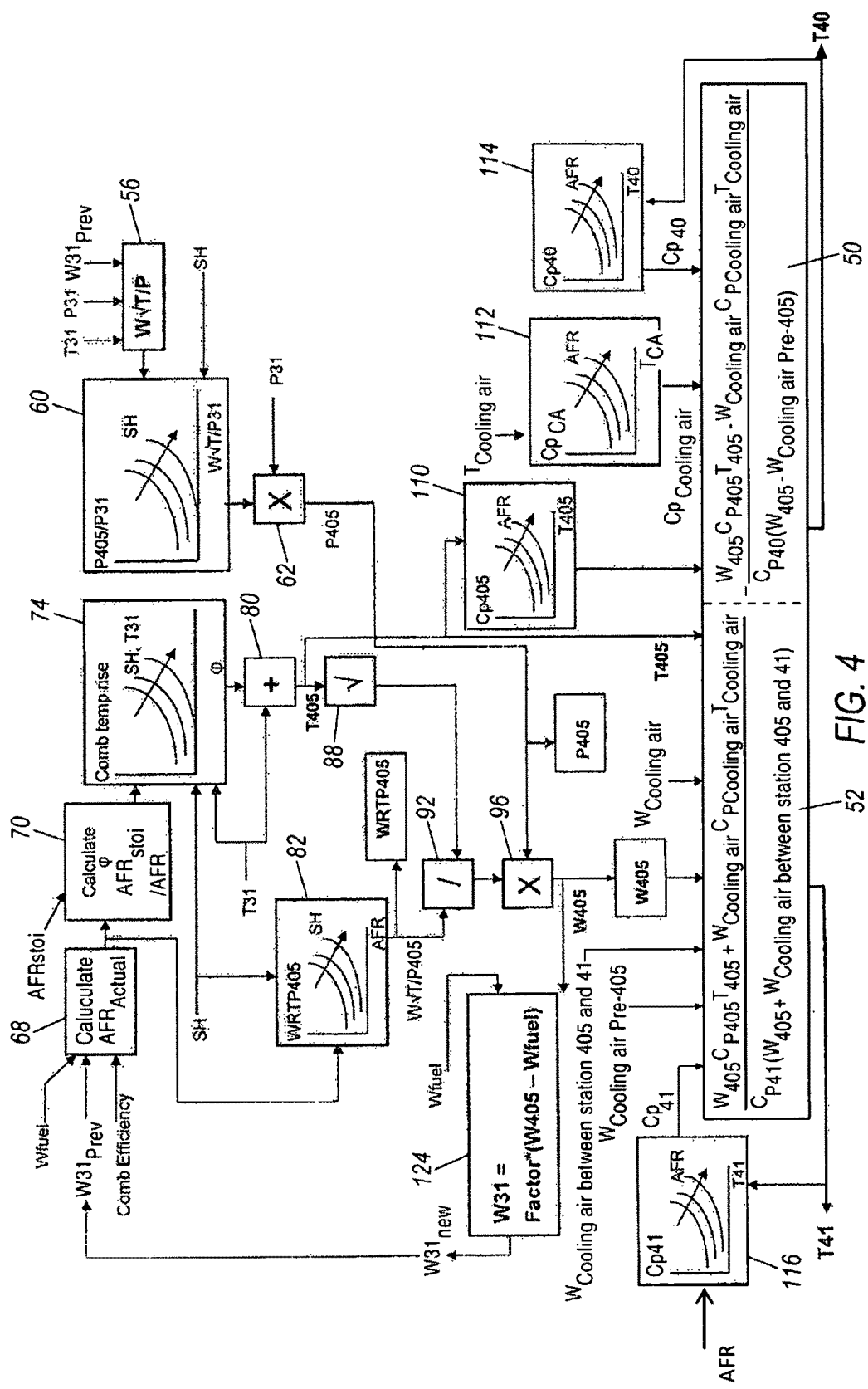
FIG. 4 is a flow diagram of a control algorithm for deriving a gas path temperature according to an embodiment.
Figure 5:
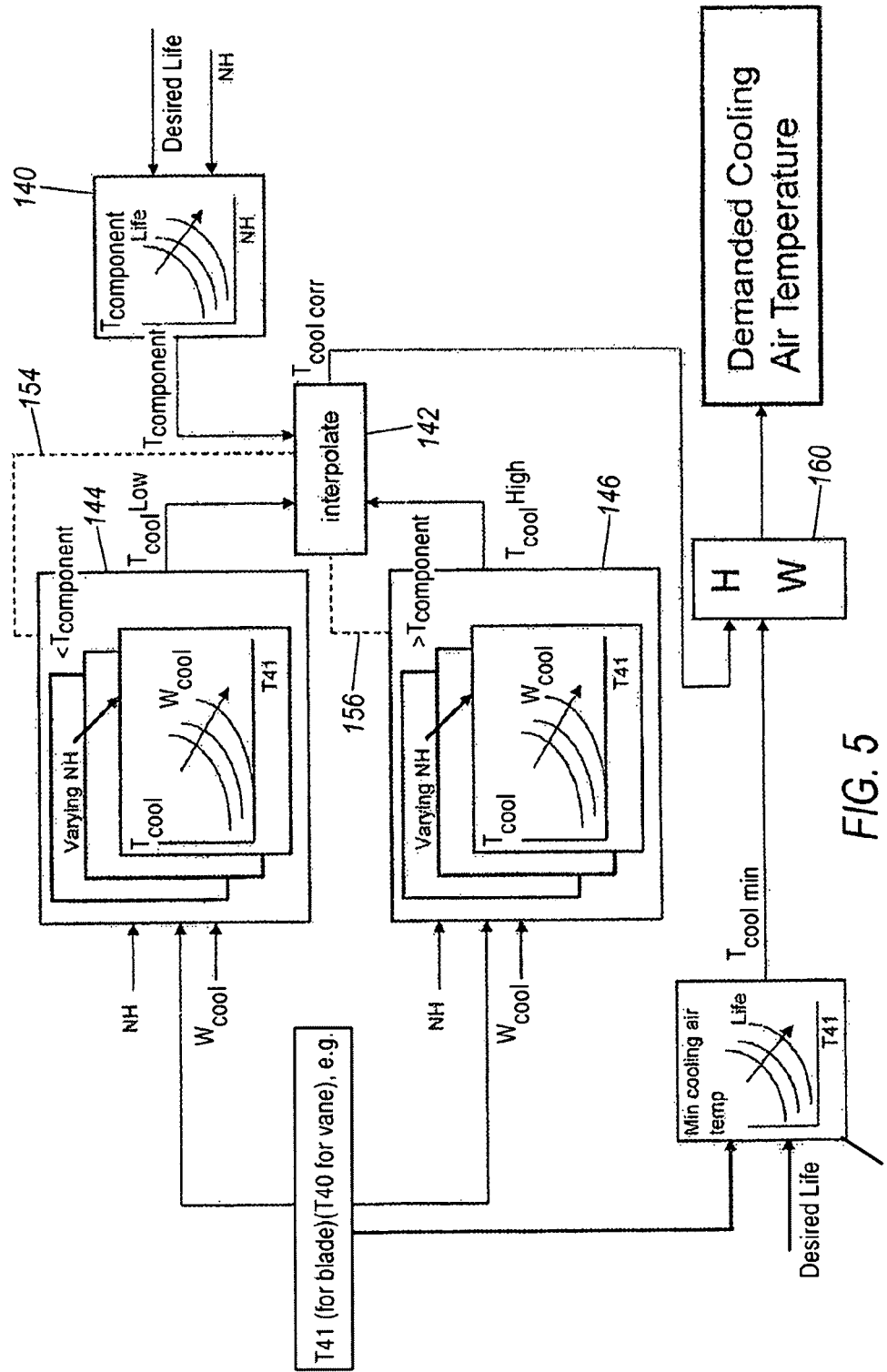
FIG. 5 is a flow diagram of a control algorithm for deriving a demanded cooling air temperature according to an embodiment.
Figure 6:
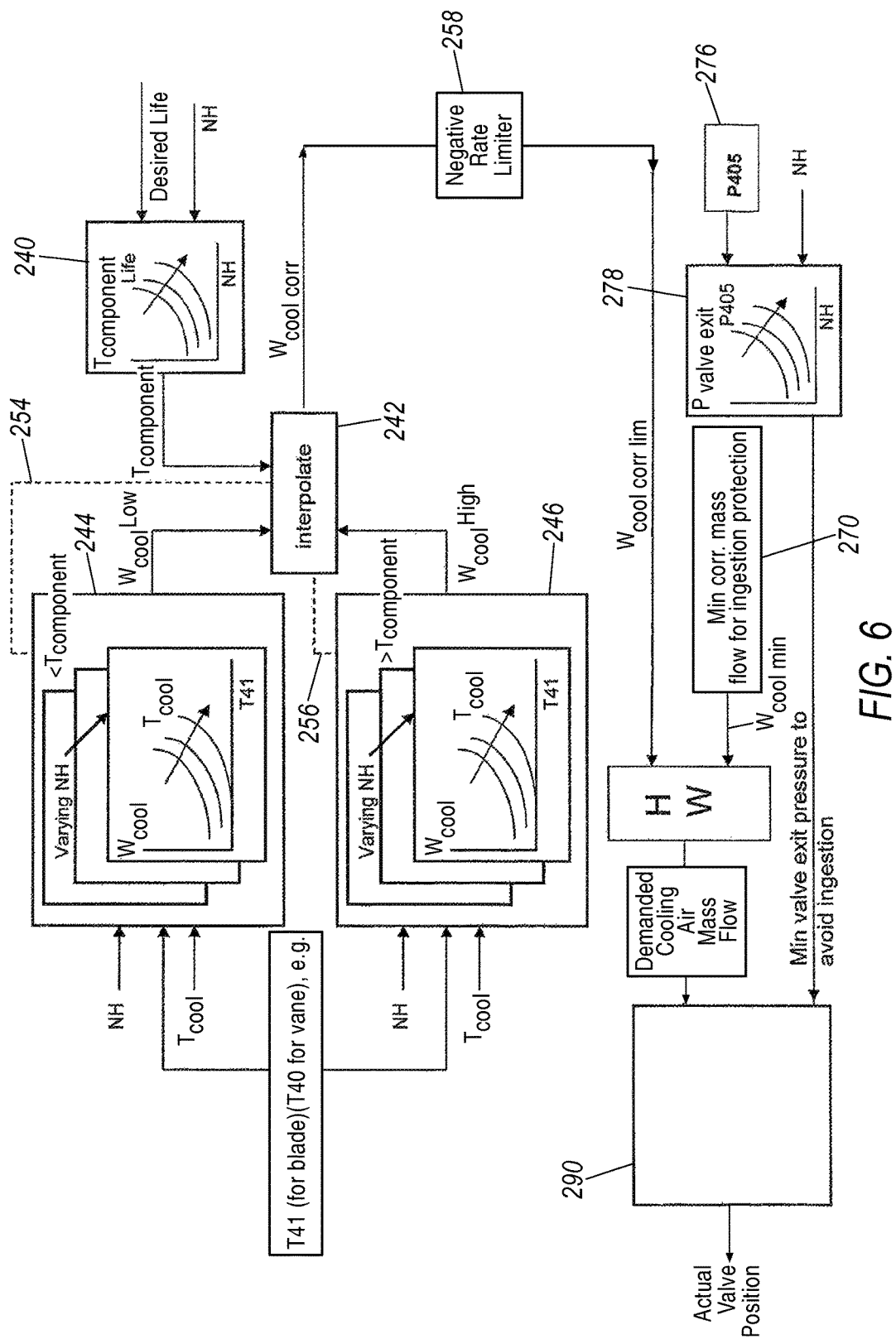
FIG. 6 is a flow diagram of a control algorithm for deriving a demanded cooling air mass flow rate according to an embodiment.

Referring now to FIGS. 4 to 6, there is shown an embodiment of three iterative control algorithm flow diagrams for modulating cooling air temperature and cooling air mass flow rate based on a predicted, or target, gas turbine component temperature (TComponent). In one form, the iterative control algorithm can be based on a correlation between the life of the gas turbine component, for example the life of the stationary member 32 and/or the life of the rotating member 34, and an aggregate function the temperature (or gas turbine temperature gradient) of the gas turbine component and the mechanical loading experienced by the gas turbine component. In an alternative or additional form, the iterative control algorithm can be based on a correlation between the temperature (or temperature gradient) of the gas turbine component and an aggregate function of one or more heat transfer parameters, such as the rotational speed of the rotating member 34 (NH), a cooling air temperature (TCooling air), a cooling air mass flow rate (WCooling air), and a gas path temperature (T31, T40, T405, T41) at one or more stations of the gas turbine engine 10, for example, the inlet of the combustion section 16 (station 31), the inlet of the stationary member 32 (station 40), the NGV throat or choke area (station 405), and the inlet of the rotating member 34 (station 41). In an alternative or additional form, the iterative control algorithm can be based on a correlation between the life of the gas turbine component, for example the life of the stationary member 32 and/or the rotating member 34, and an aggregate function of one or more of the heat transfer parameters. The correlation(s) can be derived analytically or experimentally, or a combination of these, as described in greater detail herein.

In the flow diagrams of FIGS. 5 and 6, a demanded cooling air temperature and a demanded cooling air mass flow rate are determined based on a target turbine component temperature (TComponent) associated with a desired life and/or performance (Life) of a gas turbine component, and one or more of the heat transfer parameters (NH, TCooling air, WCooling air, T31, T40, T405, T41, etc.) The target component temperature (TComponent) can be measured or derived in any suitable manner. In one embodiment, for example, the target component temperature (TComponent) is determined as that temperature (or temperature gradient) at which the gas turbine component can be maintained without the turbine component experiencing a fatigue failure over the course of the desired life and/or performance (Life) derived or indicated for the turbine component (or for the turbine section 18, or for the gas turbine engine 10), with consideration also being given to the rotational speed (NH) of the component for rotating turbine components. The heat transfer parameters in the flow diagrams of FIGS. 5 and 6 can be measured and/or derived by any suitable method, device, and/or system, as will be appreciated. In the illustrative embodiment, the heat transfer parameters of the gas path temperature at the inlet of the vane 36 of the stationary member 32 (T40) and the gas path temperature at the inlet of the blade 38 of the rotating member 34 (T41) are derived based on the FIG. 4 flow diagram, which incorporates various thermodynamic relationships and energy balance relationships among the heat transfer parameters, as will be described in greater detail below. The iterative control algorithms of FIGS. 5 and 6 utilize the measured and/or derived heat transfer parameters and the target turbine component temperature (TComponent) to derive the demanded cooling air temperature and the demanded cooling air mass flow rate, as will be described in greater detail below.

As will be appreciated, the control algorithm flow diagrams of FIGS. 4 to 6 can take the form of or be embodied in a controller, for example as shown at reference numeral 48 in the embodiment of FIGS. 2 and 3. For example, in aircraft engine applications, the control logic, whether in the form of control maps, curve fits, mathematical functions, etc., can be embodied in an electronic engine control (EEC), a full authority digital engine control (FADEC), and/or or an engine control unit (ECU), and in energy management applications the control logic can be made a part of an engine management system (EMS), an engine control system (ECS), and/or an engine control unit (ECU), as will be appreciated.

The controller 48 can be configured to control modulation of cooling air to the gas turbine components of the turbine section 18, for example, by modulating cooling air temperature and cooling air mass flow rate to each turbine component independently, by modulating cooling air temperature and cooling air mass flow rate to a stage of turbine components, and/or by modulating cooling air temperature and cooling air mass flow rate to multiple different turbine stages independently or as a group. Further, the controller 48 can comprise electrical and/or mechanical devices that can include any variety of devices such as valves, pumps, flow passages, actuators, solenoids, heat exchangers, etc., capable of controlling modulation of cooling air among any of the various gas turbine components. In an embodiment, the controller 48 can comprise multiple controllers.

In some embodiments, the controller 48 can communicate by use of shared memory or communication buses, and/or RF communications. The controller 48 can include a microprocessor or multiple microprocessors capable of receiving input command signals and/or data and/or storing data, and capable of executing and/or outputting command signals in response to the received input command signals, data and/or stored data. For example, as will be described in greater detail below, the controller 48 can receive as inputs the desired life and/or performance (Life) of the gas turbine component, the target component temperature (TComponent) if not derived by the controller 48 itself, the input of the rotational speed of the rotating member 34 (NH), the inputs of cooling air temperature (TCooling air) and cooling air mass flow rates (WCooling air, WCooling air between station 405 and 41, WCooling air pre-405), and/or the inputs of the gas path temperature(s) (T31, T40, T40, T41) at the various stations of the gas turbine engine 10. In an embodiment, the controller 48 can include computer-readable storage, such as read-only memories (ROM), random-access memories (RAM), and/or flash memories, or any other components for running an application and processing data for controlling operations associated with the controlled modulation of cooling air. As such, the controller 48 can include instructions and/or data stored as hardware, software, and/or firmware within the one or more memories, storage devices and/or microprocessors. In one form, the controller 48 can include and/or be associated with power supply circuitry, valve control circuitry, pump control circuitry, temperature control circuitry, solenoid driver circuitry, timing circuitry, switches and/or other types of circuitry, as suited for controlling the modulation of cooling air.

The controller 48 can include one or more data storage structures in the computer-readable medium containing data to facilitate operation of the controlled modulation system in connection with the control algorithm flow diagrams of FIGS. 4 to 6. Alternatively and/or additionally, the controller 48 can include one or more feedback control functions in facilitating control to a desired cooling air temperature and/or cooling air mass flow rate. Such feedback control functions can take any variety of forms, including for example continuous and bang-bang control effectors. The data storage structures can include, for example, tables, charts, maps, schedules, arrays, matrices, variable classes, curve fits and/or mathematical function constructs. For example, the target component temperature (TComponent) described herein can be set in a data storage structure such as a table, chart, map, curve fit, mathematical function, etc. as the temperature at which the gas turbine component can be maintained without for example experiencing a mechanical failure over the course of a desired life and/or performance (Life) of the turbine component, where the data storage structure includes for example a different target component temperature (TComponent) corresponding to each desired life and/or performance (Life). In one form, the target component temperature (TComponent) suitable for realizing a particular life and/or performance (Life) can be derived from fatigue strength limit analyses, endurance limit analyses, performance test analyses, and/or other engineering analyses of the gas turbine component for a particular temperature or range of temperatures (or a particular temperature gradient or range of gradients). For example, the data storage structure may include appropriate target component temperatures (TComponent), or range(s) of temperatures, that can realize various desired lives and/or performances (Life), or a range(s) of desired lives and/or performances (Life), at which a gas turbine component will operate free of fatigue failure.

Turning, then, to FIG. 4, there is shown an embodiment of a control algorithm flow diagram of the controller 48 for deriving the gas path temperature at the inlet of the vane 36 of the stationary member 32 (T40), and the gas path temperature at the inlet of the blade 38 of the rotational member 34 (T41). In making this derivation, the FIG. 4 flow diagram generates input values for energy balance equations 50, 52 located at the bottom portion of FIG. 4, the inputs including for example the pressure, temperature, and mass flow rate at the NGV choke point (station 405 in FIG. 3), as well as constant pressure coefficients (CpCooling air, Cp40, Cp405, Cp41) corresponding to various temperatures throughout the turbine section 18.

Before proceeding in greater detail with the FIG. 4 flow diagram, reference is briefly made to the schematic of the turbine section 18 shown in FIG. 3, particularly to the NGV choke point (station 405), also referred to herein as the choke area or throat of the turbine nozzle. In the present control algorithm embodiment, at the NGV choke point, a throat capacity (Q405) can be predicted, that is estimated, and based on the predicted throat capacity, a control map, described in greater detail below (control map 82), can be formed. Since the turbine nozzle is choked, by knowing the pressure and temperature of the gas at the NGV choke point (P405, T405), the gas mass flow rate (W405) can be determined based on a relationship corresponding to the predicted throat capacity (Q405). Accordingly, in the FIG. 4 flow diagram and its accompanying description herein, the control logic is such that in a particular iteration the pressure and temperature of the gas at the NGV choke point (P405, T405) are determined, followed by a calculation of the mass flow rate of the gas at the NGV choke point (W405) that is based on the determined P405 and T405.

Starting, then, at the upper right portion of FIG. 4, measured or derived values of the temperature, pressure, and mass flow rate of air at the inlet of the combustion section 16 (T31, P31, W31Prev) are input into the equation of block 56 to calculate a non-dimensional corrected flow:

$$Q = \frac{W\sqrt{T}}{P}$$

The corrected flow value Q, along with a specific humidity value (SH), are input into a controller control map 60, also referred to herein as a look-up, schedule, graph, or the like, of the controller 48. Based on these values, the control map 60 outputs a ratio (P405/P31) of the pressure at the NGV choke point (P405) to the pressure at the inlet of the combustion section 16 (P31). This output is multiplied at multiplier 62 by the measured or derived value of the pressure at the inlet of the combustion section 16 (P31), resulting in the pressure at the NGV choke point, that is P405, which is used elsewhere in the flow diagram and in the energy balance equations 50, 52.

Referring to the upper left portion of FIG. 4, an actual air/fuel ratio (AFRActual) is calculated at block 68 based on the mass flow rate of the fuel (Wfuel), the mass flow rate of air at the inlet of the combustion section 16 (W31Prev), and an efficiency factor of the combustion section 16. The equivalence ratio, $\varphi$ (phi), is then calculated at block 70 as a ratio of the actual air/fuel ratio (AFRActual) and the air/fuel ratio at stoichiometric conditions (AFRstoi). The equivalence ratio $\varphi$, along with the specific humidity value (SH) and the value of the temperature of the air at the inlet of the combustion section 16 (T31), are input into a control map 74 of the controller 48. Based on these values, the control map 74 outputs a value of a temperature rise at the combustion section 16 (Comb temp rise). This output is added at adder 80 to the measured or derived value of the temperature of the air at the entry of the combustion section (T31), resulting in the temperature of the gas at the NGV choke point, that is T405, which is used elsewhere in the flow diagram and in the energy balance equations 50, 52.

Based on the calculated values of the pressure and temperature of the gas at the NGV choke point (P405, T405), and by use of a control map 82 of the controller 48, which, as described herein, can be based on a relationship corresponding to the predicted throat capacity (Q405) at the NGV choke point (station 405), the mass flow rate of the gas at the NGV choke point (W405) can be determined. As shown in FIG. 4, the actual air/fuel ratio (AFRActual) calculated at block 68, along with the specific humidity value SH, are input into the control map 82. Based on these values, the control map 82 outputs a value of an NGV throat capacity (WRTP405), also referred to herein as the non-dimensional corrected flow (at station 405):

$$Q405 = WRTP405 = \frac{W405\sqrt{T405}}{P405}$$

This output is divided at divider 92 by the value determined at block 88 of the square root of the gas temperature value T405, and multiplied at multiplier 96 by the previously determined gas pressure value of P405, resulting in the mass flow rate of the gas at the NGV choke point, that is W405, which is used elsewhere in the flow diagram and in the energy balance equations 50, 52.

The FIG. 4 flow diagram also determines constant pressure coefficients, CpCooling air, Cp40, Cp405, Cp41, each also referred to herein as a specific heat capacity at constant pressure, based on various temperature values in the turbine section 18. For instance, the control map 110 of the controller 48, based on inputs of the measured or derived value of the temperature of the gas at the NGV choke point (T405), and the calculated air/fuel ratio (AFR), outputs a constant pressure coefficient of the gas at the NGV choke point (Cp405). The control map 112 of the controller 48, based on inputs of the measured or derived value of the temperature of the cooling air (TCooling air), and the calculated air/fuel ratio (AFR), outputs a constant pressure coefficient of the cooling air (CpCooling air). The control map 114 of the controller 48, based on inputs of the measured or derived value of the temperature of the gas at the inlet of the vane 36 of the stationary member 32 (T40), and the calculated air/fuel ratio (AFR), outputs a constant pressure coefficient of the gas at the inlet of the vane 36 of the stationary member 32 (Cp40). The control map 116 of the controller 48, based on inputs of the measured or derived value of the temperature of the gas at the inlet of the blade 38 of the rotating member 34 (T41), and the calculated air/fuel ratio (AFR), outputs a constant pressure coefficient of the gas at the inlet of the blade 38 of the rotating member 34 (Cp41). The aforedetermined constant pressure coefficients Cp405, CpCooling air, Cp40, and Cp41 are used as input values in the energy balance equations 50, 52, discussed further below.

In the flow diagrams of FIGS. 4 to 6, control is iterative and, consequently, values for the parameters may depend on, for example, the value determined by the controller 48 at a previous iteration. Further, the initial value of some parameters may be predetermined, or based on other parameters, or based on operating conditions, the turbine section 18 application, environmental factors, or other factors. For example, in the FIG. 4 flow diagram, the controller 48 can predetermine the initial value of the mass flow rate of air at the inlet of the combustion section 16 (W31Prev) based on the particular application of the turbine section 18. In the subsequent iteration, then, the controller 48 can determine the mass flow rate at the inlet of the combustion section 16 (W31new) based on the equation at block 124, that is:

W31new=Factor×(W405−Wfuel)

Where Factor represents a fraction in which the value of the mass flow rate of the air at the inlet of the combustion section 16 (W31) constitutes the numerator and the mass flow rate of the gas at the NGV choke point (W405) constitutes the denominator; that is, W31/W405. In one embodiment, for example, the Factor can represent the proportion of air flowing through station 405 that has actually passed through the combustion section 16 and is therefore not cooling air. In another embodiment, the initial value of the temperature of the gas at the inlet of the vane 36 of the stationary member 32 (T40) and the initial value of the temperature of the gas at the inlet of the blade 38 of the rotating member 34 (T41) to determine the respective constant pressure coefficients Cp40 and Cp41 in the control maps 114, 116, can be based on the temperature of the gas turbine component, the temperature of the turbine section 18, or the temperature of the gas turbine engine 10. In another embodiment, the initial value of the cooling air temperature (TCooling air) to determine the constant pressure coefficient (CpCooling air) in the control map 112, and the initial values of the cooling air mass flow rates (WCooling air, WCooling air between station 405 and 41, WCooling air Pre-405) that are input into the energy balance equations 50, 52, can be based on the initial temperature and mass flow rates at time of start-up of the gas turbine engine 10, or at start-up of the control algorithm, or at start-up of the controlled modulation cooling system.

With the station 405 values of temperature and mass flow rate T405, W405, and the afore determined constant pressure coefficients CpCooling air, Cp40, Cp405, and Cp41, the controller 48 can determined the value of the gas path temperature at the inlet of the vane 36 of the stationary member 32 (T40) and the gas path temperature at the inlet of the blade 38 of the rotating member 34 (T41) respectively by use of the energy balance equations 50, 52 at the bottom portion of FIG. 4. Thus, the controller 48 can determine the value of the gas path temperature at the inlet of the vane 36 (station 40) based on the energy balance equation 50:

$$T40 = \frac{W_{405}C_{p405}T_{405} - W_{coolingair}C_{pcoolingair}T_{coolingair}}{C_{p40}(W_{405} - W_{coolingair\,pre-405})}$$

Similarly, the controller 48 can determine the value of the gas path temperature at the inlet of the blade 38 based on the energy balance equation 52:

$$T41 = \frac{W_{405}C_{p405}T_{405} + W_{coolingair}C_{pcoolingair}T_{coolingair}}{C_{p41}(W_{405} + W_{coolingair\,between\,station\,405\,and\,41})}$$

The controller 48 can use the values of T40 and T41, along with other parameters to be described in greater detail below, in the FIG. 5 flow diagram for determining a demanded cooling air temperature and in the FIG. 6 flow diagram for determining a demanded cooling air mass flow rate. In the present embodiment, the FIG. 5 flow diagram of the controller 48 controls modulation of the cooling air temperature while treating the value of the cooling air mass flow rate (for example WCool) as unmanaged, constant, based on a predetermined condition, determined by another control algorithm (for example, the FIG. 6 flow diagram) of the controller 48, and/or determined by another controller. Similarly, in the present embodiment, the FIG. 6 flow diagram of the controller 48 controls modulation of the cooling air mass flow rate while treating the value of the cooling air temperature (for example TCool) as unmanaged, constant, based on a predetermined condition, determined by another control algorithm (for example, the FIG. 5 flow diagram) of the controller 48, and/or determined by another controller. As with other input parameters discussed herein, the values may be iterative, and thus determined or derived based on values of a previous iteration.

Turning to the FIG. 5 flow diagram of the controller 48, a method of determining a demanded cooling air temperature according to an embodiment will now be described. Starting at the upper right portion of FIG. 5, a desired life and/or performance (Life), for example a desired number of hours of operation of the turbine component, for example the blade 38, and a measured or derived value of the rotational speed (NH) of the rotating member 34, are input into a control map 140 of the controller 48. Based on these values, the control map 140 outputs a target component temperature (TComponent) to an interpolate block 142, to be described in greater detail below. In the FIG. 5 embodiment, the target component temperature (TComponent) is that temperature that will enable the gas turbine component, in this particular example the blade 38, to obtain the inputted desired life and/or performance (Life) before failure of the gas turbine component, based on for example analytically and/or experimentally derived fatigue relationships between the component temperature and the number of desired hours, that is the desired life and/or performance (Life) of the component. The fatigue relationships can incorporate any number of fatigue failure mechanisms that vary based on component temperature, for example, fatigue due to excessive thermal loads or variations in thermal loads, or fatigue due to thermally-induced cyclic stress, or fatigue caused by thermally induced buckling, fracture, creep, corrosion, etc. As will be appreciated, the analytically and/or experimentally derived fatigue relationships may also incorporate factors of safety, for example, incorporated into the desired life and/or performance (Life) values, the target component temperature (TComponent) values, or various combinations thereof.

It will be appreciated that the desired life and/or performance (Life) can be inputted to the control map 140 in any suitable manner, for example by way of a user input, by an automated system, or by any other method of communicating the desired life and/or performance (Life) to the controller 48. Further, it will be appreciated that the desired life and/or performance (Life) inputted to the control map 140 can constitute the desired life or desired performance of the gas turbine component, the desired life or desired performance of the stationary member 32 and/or the rotating member 34, the desired life or performance of the turbine section 18, the desired life or performance of the gas turbine engine 10, among others. Still further, the desired life and/or performance (Life) inputted to the control map can be limited to a range of values, for example, between a low number of hours corresponding to relatively high power-demanding and less efficient applications, and a high number of hours corresponding to relatively more efficient and less power-demanding applications.

It will be appreciated that for a non-rotating component of the turbine section 18, such as the vane 36 of the stationary member 32, the value of the rotational speed (NH) can be set to zero; this zero value applying throughout the FIG. 5 flow diagram where rotational speed (NH) appears as an input parameter. In an alternative embodiment, particularly for applications in which the demanded cooling air temperature is not based on the parameters of a rotating component, the rotational speed (NH) can be eliminated as an input variable from the control algorithm flow diagram, or similar control logic of the controller 48. This, of course, would reduce the number of calculations performed by the control architecture, such as the control map 140 and other control maps of the FIG. 5 flow diagram, as would occur to those skilled in the art.

Referring to the left portion of FIG. 5, the value of the rotational speed (NH) of the rotating member 34, along with the value of the gas path temperature at the inlet of the blade 38 of the rotating member 34 (T41) determined for example by the FIG. 4 flow diagram, as well as the value of the cooling air mass flow rate WCool, are input to control maps 144, 146 of the controller 48. The control maps 144, 146 make their determination based on the value of the target component temperature (TComponent) output by the control map 140, and in this regard the control maps 144, 146 represent four dimensional look-ups in which the parameters include the values of NH, T41, WCool, and TComponent. In another or additional form, one or more polynomial curve fits may be utilized in which for example the parameters NH, T41, WCool, and TComponent represent data points, constraints, or the like fit to the curve, as will be appreciated. In the present embodiment, the control maps 144, 146 are extracted, supplied, derived, or otherwise provided from a collection of control maps comprising part of the data storage structure of the controller 48, for example, and correspond to different target component temperature TComponent values. Thus, in the present embodiment, the input of the desired life and/or performance (Life), which will determine the target component temperature (TComponent) value, will determine the control maps 144, 146, that will be employed by the controller 48 in the control architecture of FIG. 5. In the embodiment of FIG. 5, the control maps 144, 146 correspond to lower and upper target component temperature TComponent values that straddle the target component temperature TComponent value output by the control map 140. In a more particular aspect of the FIG. 5 embodiment, the control maps 144, 146 correspond to target component temperature TComponent values that are a nearest value below (<TComponent) and a nearest value above (>TComponent), respectively, the value of the target component temperature TComponent output by the control map 140. In FIG. 5, the dashed line 154 serves as a link between the control map 144 and the interpolate block 142 to indicate that the control map 144 corresponds to a target temperature component TComponent value below (<TComponent) that of the target component temperature TComponent value output by the control map 140, and the dashed line 156 serves as a link between the control map 146 and the interpolate block 142 to indicate that the control map 146 corresponds to a target temperature component TComponent value above (>TComponent) that of the target component temperature TComponent value output by the control map 140.

The control map 144, based on inputs of the measured or derived value of the rotational speed (NH) of the rotating member 34, the value of the gas path temperature at the inlet of the blade 38 (T41), and the value of the cooling air mass flow rate (WCool), outputs a cooling air temperature (TCool Low) value corresponding to the nearest target temperature component TComponent value below (<TComponent) that of the target component temperature TComponent value output by the control map 140. Similarly, the control map 146, based on inputs of the measured or derived value of the rotational speed (NH) of the rotating member 34, the value of the gas path temperature at the inlet of the blade 38 (T41), and the value of the cooling air mass flow rate (WCool), outputs a cooling air temperature (TCool High) value corresponding to the nearest target temperature component TComponent value above (>TComponent) that of the target component temperature TComponent value output by the control map 140. The TCool Low and TCool High values are then input into the interpolate block 142.

The interpolate block 142 of the FIG. 5 control algorithm formulates first and second interpolation data points based on the values received from the control maps 144, 146. The first data point can be formed from, for example, the cooling air temperature (TCool Low) value and the low target temperature component TComponent (<TComponent) value. The second data point can be formed from, for example, the cooling air temperature (TCool High) value and the high target temperature component TComponent (>TComponent) value. The interpolate block 142 then interpolates between the first and second interpolation data points to determine a cooling air temperature (TCool Corr) that corresponds to the target component temperature TComponent value output by the control map 140. The cooling air temperature (TCool Corr) is then output to a High Wins block 160, to be described in greater detail below. It will be appreciated that any type of interpolation method can be employed by the interpolation block 142, including for example linear interpolation, cubic interpolation, to name a few. Further, although the illustrative embodiment utilizes only two data points, the present application contemplates use of any number of interpolation data points, which can be based on, for example, the particular characteristics or operating conditions of the gas turbine, the interpolation technique employed, and/or the desired robustness in accuracy in the results of the interpolation.

Reference is now made to the bottom left of the FIG. 5 flow diagram of the controller 48. The control map 170 of the controller 48 makes a minimum cooling air temperature determination that serves as a protection against high component temperature gradients. In some applications, for some particular component materials, there may be a threshold at which the temperature gradients, and the thermo-mechanical stresses caused thereby, are too high for the material such that the material may experience cracking, fracture, and/or other deleterious effects. The control map 170 serves to protect against such effects by providing a minimum cooling air temperature (TCool min) that will protect against the generation of too high temperature gradients in the gas turbine component; that is, the control map 170 in one form operates as a hard stop to make sure the cooling air does not, for example, overcool to an unacceptable or undesirable temperature gradient in the gas turbine component. In the illustrative embodiment of FIG. 5, for example, the control map 170, based on inputs of the value of the gas path temperature at the inlet of the blade 38 of the rotating member 34 (T41) and the value of the desired life and/or performance (Life), determines a minimum cooling air temperature (TCool min), and outputs the minimum cooling air temperature (TCool min) to the High Wins block 160.

As will be appreciated, in an embodiment, a greater demand in performance may call for a relatively shorter life expectancy of a gas turbine component and, consequently, a relatively shorter desired life and/or performance (Life) input. As such, the value of the minimum cooling air temperature (TCool min) output by the control map 170 may be relatively lower to facilitate such increased performance, and thus a crack or other deleterious effect may be expected to develop relatively sooner. Thus, in the illustrative embodiment the control algorithm flow diagram of the controller 48 can facilitate a trade in life of the gas turbine component for greater performance out of the gas turbine component.

The High Wins block 160 of the controller 48 then compares the value of the cooling air temperature (TCool Corr) from the interpolate block 142 with the value of the cooling air temperature (TCool min) from the control map 170, and outputs the higher of the two values, resulting in the demanded cooling air temperature. The controller 48 then controls the modulation of appropriate valves, heat exchangers, etc. of the gas turbine engine 10 to obtain the demanded cooling air temperature, which the controller 48 can, in turn, utilize in channeling the cooling air to one or more of, for example, the flow passages 26, 28, and 30, of the FIG. 2 embodiment, and/or to other components or portions of the turbine section 18 for cooling.

The present application contemplates that the turbine component temperature used in the FIG. 5 flow diagram, and elsewhere herein, including for example the FIG. flow diagram, could be replaced by the turbine component temperature gradient, this being dependent on for example the turbine operator's preferences, the particular application and operating conditions of the gas turbine, or other considerations, as would occur to those skilled in the art.

Further, the present application contemplates that the control algorithm logic of the controller 48 can run concurrently for the vane 36 and the blade 38. In the FIG. 2 embodiment, for example, the control algorithm can modulate control of cooling air temperature and cooling air mass flow rate for the vane 36 via flow passages 26 and 28, and modulate control of cooling air temperature and cooling air mass flow rate for the blade 38 via flow passage 30, simultaneously. Further, the present application contemplates running the control algorithm logic into other turbines that are cooled, for example, running the logic into the gas turbine engine 10 for two, three, or four stages of vanes and blades. Each turbine component or turbine stage or turbine portion, for example, can have an associated valve, heat exchanger, etc., for example, to independently modulate control of cooling air temperature and/or cooling air mass flow rate.

Referring now to the FIG. 6 flow diagram of the controller 48, it will be appreciated by those skilled in the art that the controller's logic, that is the control architecture, in the upper portion of the flow diagram is substantially the same as that of the FIG. 5 flow diagram. For purposes of brevity in description, the FIG. 6 flow diagram will be described with respect to its differences from the FIG. 5 flow diagram, it being understood that the description pertaining to the FIG. 5 flow diagram is otherwise equally applicable to the FIG. 6 flow diagram as though fully set forth herein.

In the upper right portion of the FIG. 6 flow diagram, the control map 240 of the controller 48 operates in the same manner as described above with respect to the control map 140 of the FIG. 5 flow diagram. In the left portion of the FIG. 6 flow diagram, the input values into the control maps 244, 246 differ from the input values into the control maps 144, 146 of the FIG. 5 flow diagram in that, instead of the cooling air mass flow rate (WCool) being an input value as in the FIG. 5 flow diagram, in the FIG. 6 flow diagram the cooling air temperature (TCool) is an input value. Further, the control maps 144, 146 of the FIG. 5 flow diagram determine TCool Low and TCool High based on low and high links 154 and 156, and the input parameters NH, T41, WCool, and TComponent, whereas in the FIG. 6 flow diagram, the control maps 244, 246 determine WCool Low and WCool High based on low and high links 254 and 256, and input parameters NH, T41, TCool, and TComponent. The interpolate block 142 of the FIG. 5 flow diagram determines a cooling air temperature (TCool Corr) that corresponds to the target component temperature TComponent value output by the control map 140 based on an interpolation between a first data point consisting of a low cooling air temperature value and a low target temperature component value (TCool Low, <TComponent), and a second data point consisting of a high cooling air temperature value and a high target temperature component value (TCool High, >TComponent), whereas in the FIG. 6 flow diagram, the interpolate block 242 determines a cooling air mass flow rate (WCool Corr) that corresponds to the target component temperature TComponent value output by the control map 240 based on an interpolation between a first data point consisting of a low cooling air mass flow rate value and a low target temperature component value (WCool Low, <TComponent), and a second data point consisting of a high cooling air mass flow rate value and a high target temperature component value (WCool High, >TComponent). The cooling air mass flow rate (WCool Corr) of the FIG. 6 control logic is output to a negative rate limiter 258 and then to a High Wins block 260, both described in greater detail below.

In an embodiment, the negative rate limiter 258 can be provided between the interpolate block 242 and the High Wins block 260 of the controller 48 to provide one or more ingestion protection control mechanisms described herein with sufficient time to react by slowing the decrease of the cooling air mass flow rate (WCool Corr). Some gas turbine engine applications may operate under relatively highly transient conditions, for example where engine power is rapidly decreased, which could prompt a relatively rapid decrease in the rate at which the cooling air mass flow rate is changed, potentially presenting ingestion issues. In the present embodiment, to account for such conditions, or any operating condition that could cause too rapid of a rate of decrease in cooling air mass flow rate, the negative rate limiter 258 of the controller 48 provides a limited cooling air mass flow rate value (WCool corr Lim) to prevent the cooling air mass flow rate from decreasing too rapidly, for example from one iteration to a subsequent iteration, and thereby allows an ingestion protection mechanism sufficient time to react. That is, the block 258 serves to prevent too rapid a decrease in the cooling air mass flow rate before appropriate ingestion protections, for example as described herein, are implemented. As will be appreciated, although the negative rate limiter 258 may cause overcooling for a relatively short amount of time, due to slowing the rate at which the cooling air mass flow rate is reduced, and in so doing perhaps minimally negatively affect fuel consumption, this serves as a trade against causing potentially deleterious effects to the engine. The limited cooling air mass flow rate value (WCool corn Lim) can comprise a constant throughout operation, vary based on the particular type of gas turbine or gas turbine engine 10, or vary based on particular operating conditions and/or environmental characteristics, as will be appreciated. The negative rate limiter 258 outputs to the High Wins block 260 the value of the cooling air mass flow rate (WCool Corr) from the interpolate block 242 or, if the value is limited by the negative rate limiter 258, the limited cooling air mass flow rate (WCool Corr Lim).

Reference is now made to block 270 of the FIG. 6 flow diagram. The block 270 comprises an ingestion protection mechanism that provides a value of a minimum cooling air mass flow rate (WCool min) to protect against ingestion of combustion gas products. In some gas turbine engine applications, or for some particular gas turbine components or configurations, there may be a threshold at which the cooling air mass flow rate is too low as to cause ingestion of combustion gas products into the component, causing for example plastic deformation or creep in the component, and deleteriously affecting performance of the component and the turbine section 18 of which it is a part. For example, in an embodiment in which the gas turbine component comprises the disk and/or blade 38 of the rotating member 34, the block 270 can provide a minimum cooling air mass flow rate (WCool min) that will serve to protect against ingestion of combustion gas products into the disk or blade 38, thus preventing or inhibiting blade creep and/or disk creep; that is, the block 270 in one form can operate as a hard stop to make sure the cooling air mass flow rate is above a threshold below which ingestion can deleteriously affect the gas turbine component. In the FIG. 6 embodiment, the block 270 outputs the minimum cooling air mass flow rate (WCool min) to the High Wins block 260. It will be appreciated that the minimum cooling air mass flow rate (WCool min) of the block 270 can be set in the FIG. 6 flow diagram in any suitable manner, for example by way of a user input, by an input of the controller 48, or by any other method of communicating a minimum cooling air mass flow rate (WCool min) to avoid ingestion.

In addition to, or as alternative to, the ingestion protection mechanism of block 270, an ingestion protection mechanism can be provided within the control maps of the controller 48, for example, the control maps 244, 246 of the FIG. 6 flow diagram.

The High Wins block 260 of the controller 48 then compares the value of the cooling air mass flow rate (WCool Corr) from the interpolate block 242, or the cooling air mass flow rate (WCool Corr Lim) limited by the negative rate limiter 258 (if so limited), with the value of the cooling air mass flow rate (WCool min) from the ingestion protection block 270, and outputs the higher of the two values, resulting in the demanded cooling air mass flow rate. The controller 48 then controls the modulation of appropriate valves, heat exchangers, etc. of the gas turbine engine 10 to obtain the demanded cooling air mass flow rate, which the controller 48 can, in turn, utilize in channeling the cooling air to one or more of, for example, the flow passages 26, 28, and 30, of the FIG. 2 embodiment, and/or to other components or portions of the turbine section 18 for cooling.

The bottom portion of FIG. 6 also provides an ingestion protection control mechanism according to an embodiment. The control map 278 shown at the bottom of FIG. 6 can account for, for example, the actual gas path pressure at station 405 that is P405 and a pressure drop across a cooling air modulating valve. In the illustrative embodiment, the control map 278 receives two inputs, the value of the pressure at the NGV choke point (P405) provided by a block 276 and a measured or derived value of the rotational speed (NH) of the rotating member 34. Based on these values, the control map 278 outputs an ingestion protection parameter, which, in the FIG. 6 embodiment, comprises the minimum pressure at the exit of the cooling air modulating valve that will protect against ingestion of combustion gas products. This minimum valve exit pressure protects against ingestion of combustion gas products that can deleteriously affect the performance of the turbine component or the gas turbine engine 10 of which it is a part. Thus, the control map 278 in one form can operate as an additional and/or alternative hard stop (to the earlier described hard stop of block 270 and/or ingestion protection mechanisms incorporated into the control maps 244, 246) to make sure the exit pressure of the cooling air modulating valve is above a threshold below which ingestion can deleteriously affect the gas turbine component.

Block 290 of the controller 48 can comprise a valve position control mechanism. Block 290 receives as inputs the value of the demanded cooling air mass flow rate from the High Wins block 260 and the value of the minimum valve exit pressure to avoid ingestion from control map 278, and outputs an actual valve position value to achieve an appropriate pressure to avoid ingestion of combustion gas products.

As will be appreciated by those skilled in the art, the control maps of FIGS. 4 to 6 can take on any form, for example, as schedules, look-up tables, look-up graphs, or any other mechanism embodying multidimensional correlation(s), and can be embodied in the controller 48, as described herein. Further, it will be appreciated that the control logic of the controller 48 can, as an alternative to or additionally to control maps, tables, graphs, etc., be in the form of curve fits and/or mathematical functions that take into consideration any number or degree of data points, constraints, conditions, extrapolations, etc., for example a first degree polynomial curve fit, or a second, third, or even a fourth degree polynomial curve fit, etc.

In an embodiment, the control maps utilized by the control architecture of the control algorithm flow diagram(s) herein can be based on any one of, or combination of, heat transfer relationships, thermodynamic relationships, mechanical loading relationships, among other relationships, to establish a gas turbine target component temperature against one or more heat transfer parameters. Further, in an embodiment, the control maps utilized by the control architecture of the control algorithm flow diagram(s) herein can be formulated based on one or more of metal fatigue analyses, thermal analyses, stress analyses, finite element analyses, among others, to establish a gas turbine target component temperature against one or more heat transfer parameters.

As will be appreciated, the control maps utilized by the control architecture of the control algorithm flow diagram(s) herein can be different depending on specific turbine component geometry. In an embodiment, the control algorithm flow diagrams can employ one set of control maps for blades of one size, and a different set of control maps for blades of a different size. In an embodiment, the control algorithm flow diagrams can employ one set of control maps for vanes made of one type of metal or metal alloy, and a different set of control maps for vanes made of a different type of metal or metal alloy. In an embodiment, the control algorithm flow diagrams can employ one set of control maps for turbine components at one stage of the gas turbine, and another set of control maps for turbine components at a different stage. Still further, control maps can vary based on the type of gas turbine, the type of gas turbine engine 10, or the application of the gas turbine engine 10, as will be appreciated.

As will be appreciated, the present application can provide a control algorithm to control the modulation of cooling air (cooled or un-cooled). In an embodiment, the cooling air can be efficiently used in a gas turbine at part power, so that the cooling air can meet the cooling requirement without excessive heat rejection from the gas turbine or the gas turbine thermodynamic cycle. In one form, then, the modulation can be controlled by the controller 48 to meet performance demands in off-design conditions. In one form, the control algorithm can reduce cooling air mass flow rate and/or cooling air temperature (including applications having cooled cooling air capability) for the stationary member 32 and the rotating member 34 turbine components while maintaining desired component life.

In an embodiment, the control algorithm can control modulating cooling air mass flow rate and/or cooling air temperature used to cool turbine components such as vanes and blades and maintain their desired life in the gas turbine engine. In one form, the gas turbine can be open cycle or closed cycle.

In an embodiment, the controller 48 can control modulation of cooling air based on the predicted temperature of the turbine component. In one form, the turbine's rotor and stator life can be based on for example, an aggregate function of the component's temperature or temperature gradient and mechanical loading. In one form, the rotor and stator component temperature (or temperature gradient) can be based on an aggregate function of rotational speed, cooling air temperature, gas path temperature and cooling air mass flow. In one form, the component temperature (or temperature gradient) can be predicted in real time through a correlation derived analytically or experimentally, in the case in which, for example, the gas path temperature is provided or derived. In one form, the parameters influencing the component temperature can be measured, detected, or determined by other suitable systems and methods. In one form, controller 48 can control the component temperature (or temperature gradient) in a closed loop fashion to achieve the component temperature for realizing the desired life (rotor and stator), using the real time correlation and exerting an active control on either cooling air mass flow rate or cooling air temperature or both.

In an embodiment, for example where the component temperature gradient requires a decrease through a cooling air that is hotter than the compressor offtake temperature, the control algorithm of the controller 48 can be used to control modulation of the cooling air temperature and cooling air mass flow rate (that is, the heating of the "cooling air"), such that the temperature gradient of the components (for example, disk, blades or vanes) is minimized.

Although the present application has been described according to the control algorithm flow diagrams depicted in FIGS. 4 to 6, embodied for example in the controller 48, the application need not be limited as such; other embodiments are contemplated herein.

For example, in an embodiment, the control algorithm can be used to determine the demanded cooling air mass flow rate or cooling air temperature in a gas turbine engine with internally or externally cooled cooling air.

In another embodiment, the control algorithm can be used to determine the demanded cooling air mass flow rate of the rotating member and/or stationary member turbine components in a gas turbine engine with regular (non-cooled) cooling air.

In another embodiment, for example in which both the cooling air mass flow rate and the cooling air temperature are modulated, the modulation of the mass flow rate can be used to reduce or minimize emissions while the modulation of the cooling air temperature can be used to reduce or minimize the heat rejection of the cycle.

In another embodiment, for example in which the cooling air is heated during the starting regime to minimize temperature gradient in the cooled part of the gas turbine engine 10, the control algorithm can be used to determine the cooling air temperature suitable to reduce or minimize the temperature gradient.

In another embodiment, for example in a steam-injected gas turbine (for example SIGT or Super SIGT) application, where cooling is achieved with steam as well as air, the steam percentage could if necessary or desired be added to the control maps, for example as another layer to interpolate, to allow calculation/modulation of the cooling air temperature and/or cooling air mass flow rate.

As will be appreciated, the control algorithm can improve the part load efficiency of a gas turbine equipped with cooled cooling air by reducing/minimizing the amount of heat rejected and reducing/minimizing the cooling air mass flow rate. It is also contemplated that the control algorithm can modulate cooling air in a system that does not utilize an additional external cooling process. It is also contemplated that by closed loop control on both cooling air temperature and cooling air mass flow rate, part power emission can be improved by controlling the mass flow rate of air going through the combustion section 16.

It will further be appreciated that, for stress lifting, the control algorithm can maintain the component metal temperature below a desired threshold.

It will further be appreciated that the controller 48, that is the control algorithm, can be used to control adjustment or modulation of the amount of cooling air according to a gas turbine operator's requirement(s), such that it is possible to trade between performance and life based on the operator's preference(s). In one form, for example when performance has precedence over engine component life, the controller 48, for example via operator selective input, can control modulation to operate the engine component at a higher target component temperature, or temperature gradient, and for cooled and non-cooled cooling air applications, the controller 48 (for example via operator instruction) can control modulation to reduce/minimize the amount of cooling air mass flow. In another form, for example when performance has precedence over engine component life, the controller 48, for example via operator selective input, can control modulation to operate the engine component at a higher target component temperature, or temperature gradient, and for cooled cooling air applications, the controller 48 (for example via operator instruction) can control modulation to reduce/minimize the amount of heat rejection outside of the main gas turbine cycle by raising the cooled cooling air temperature.

Any theory, mechanism of operation, proof, or finding stated herein is meant to further enhance understanding of embodiment of the present disclosure and is not intended to make the present disclosure in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the disclosure have been illustrated and described in detail in the drawings and foregoing description, the same is to be considered as illustrative and not restrictive in character, it being understood that only the selected embodiments have been shown and described and that all changes, modifications and equivalents that come within the spirit of the disclosure as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow.

What is claimed is:

1. A method of modulating the cooling of a gas turbine engine component, comprising:
   determining a target component temperature value of a gas turbine engine component based on a desired life of the gas turbine engine component;
   calculating one or more of a demanded cooling air temperature and a demanded cooling air mass flow rate based on the target component temperature value and one or more heat transfer parameters comprising one or more of a gas path temperature at an inlet of the component, and a previous cooling air mass flow rate; and
   controlling modulation of one or more of the cooling air temperature and the cooling air mass flow rate according to respectively the one or more of the demanded cooling air temperature and the demanded cooling air mass flow rate to maintain the target component temperature value;

wherein the calculating comprises determining low and high component temperature values respectively lower and higher than the target component temperature value; determining, based on the gas path temperature at the inlet of the component, and the previous cooling air mass flow rate, low and high cooling air temperature values corresponding respectively to the low and high component temperature values; and calculating the demanded cooling air temperature based on an interpolation between a first data point comprising the low cooling air temperature value and the low component temperature value and a second data point comprising the high cooling air temperature value and the high component temperature value.

2. The method of claim 1, in which the target component temperature value comprises a target component gradient temperature value.

3. The method of claim 1, in which the one or more heat transfer parameters further comprises a rotational speed of the component and wherein the low and high cooling air temperature values are determined additionally based on the rotational speed of the component.

4. A method of modulating the cooling of a gas turbine engine component, comprising:
determining a target component temperature value of a gas turbine engine component based on a desired life of the gas turbine engine component;
calculating one or more of a demanded cooling air temperature and a demanded cooling air mass flow rate based on the target component temperature value and one or more heat transfer parameters comprising one or more of a gas path temperature at an inlet of the component, and a previous cooling air temperature; and
controlling modulation of one or more of the cooling air temperature and the cooling air mass flow rate according to respectively the one or more of the demanded cooling air temperature and the demanded cooling air mass flow rate to maintain the target component temperature value;
wherein the calculating comprises determining low and high component temperature values respectively lower and higher than the target component temperature value; determining, based on the gas path temperature at the inlet of the component, and the previous cooling air temperature, low and high cooling air mass flow rate values corresponding respectively to the low and high component temperature values; and calculating the demanded cooling air mass flow rate based on an interpolation between a first data point comprising the low cooling air mass flow rate value and the low component temperature value and a second data point comprising the high cooling air mass flow rate value and the high component temperature value.

5. The method of claim 4, in which the one or more heat transfer parameters further comprises a rotational speed of the component and wherein the low and high cooling air mass flow rate values are determined additionally based on the rotational speed of the component.

6. A gas turbine component control modulation cooling system comprising:
a target component temperature determination unit configured to determine a target component temperature value of a gas turbine engine component based on a desired life of the gas turbine engine component;
a cooling air determination unit arranged to calculate one or more of a demanded cooling air temperature and a demanded cooling air mass flow rate based on the target component temperature value and one or more heat transfer parameters comprising one or more of a gas path temperature at an inlet of the component, and a previous cooling air mass flow rate; and
a control system configured to control modulation of one or more of the cooling air temperature and the cooling air mass flow rate according to respectively the one or more of the demanded cooling air temperature and the demanded cooling air mass flow rate to maintain the target component temperature value;
wherein the cooling air determination unit is arranged to determine low and high component temperature values respectively lower and higher than the target component temperature value; determine, based on the gas path temperature at the inlet of the component, and the previous cooling air mass flow rate, low and high cooling air temperature values corresponding respectively to the low and high component temperature values; and calculate the demanded cooling air temperature based on an interpolation between a first data point comprising the low cooling air temperature value and the low component temperature value and a second data point comprising the high cooling air temperature value and the high component temperature value.

7. A gas turbine component control modulation cooling system according to claim 6 wherein the one or more heat transfer parameters further comprises a rotational speed of the component and wherein the cooling air determination unit is configured to determine the low and high cooling air temperature values additionally based on the rotational speed of the component.

8. A gas turbine component control modulation cooling system comprising:
a target component temperature determination unit configured to determine a target component temperature value of a gas turbine engine component based on a desired life of the gas turbine engine component;
a cooling air determination unit arranged to calculate one or more of a demanded cooling air temperature and a demanded cooling air mass flow rate based on the target component temperature value and one or more heat transfer parameters comprising one or more of a gas path temperature at an inlet of the component, and a previous cooling air temperature; and
a control system configured to control modulation of one or more of the cooling air temperature and the cooling air mass flow rate according to respectively the one or more of the demanded cooling air temperature and the demanded cooling air mass flow rate to maintain the target component temperature value;
wherein the cooling air determination unit is arranged to determine low and high component temperature values respectively lower and higher than the target component temperature value; determine, based on the gas path temperature at the inlet of the component, and the previous cooling air temperature, low and high cooling air mass flow rate values corresponding respectively to the low and high component temperature values; and calculate the demanded cooling air mass flow rate based on an interpolation between a first data point comprising the low cooling air mass flow rate value and the low component temperature value and a second data point comprising the high cooling air mass flow rate value and the high component temperature value.

9. A gas turbine component control modulation cooling system according to claim 8 wherein the one or more heat transfer parameters further comprises a rotational speed of the component and wherein the cooling air determination unit is configured to determine the low and high cooling air mass flow rate values additionally based on the rotational speed of the component.

* * * * *